May 10, 1932. J. F. LAMB 1,857,554
COFFEE PERCOLATOR AND THE LIKE
Filed Sept. 23, 1929

Inventor
Joseph F Lamb
By W. Clay Lindsey.
Attorney

Patented May 10, 1932

1,857,554

UNITED STATES PATENT OFFICE

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT

COFFEE PERCOLATOR AND THE LIKE

Application filed September 23, 1929. Serial No. 394,526.

This invention relates to improvements in coffee percolators and the like, and has as its aim to provide an improved arrangement by means of which the liquid is caused to circulate more or less positively and in a continuous uniform stream through the vaporizing or heating chamber and the fountain tube. To this end, my improved arrangement is such that the passage leading from the pot to the vaporizing chamber is of unvarying size at all times irrespective of the jumping or movement of parts of the pump under the impulses with which the fluid is forced through the fountain tube.

A further aim of the invention is to provide an improved arrangement wherein the liquid is effectively and rapidly heated to the desired temperature as it passes into and through the vaporizing chamber.

Another object of the invention is to provide an arrangement of this sort which is characterized by its extreme simplicity in construction, its economy in manufacture, and the ease and facility with which the parts may be kept in a clean and sanitary condition.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
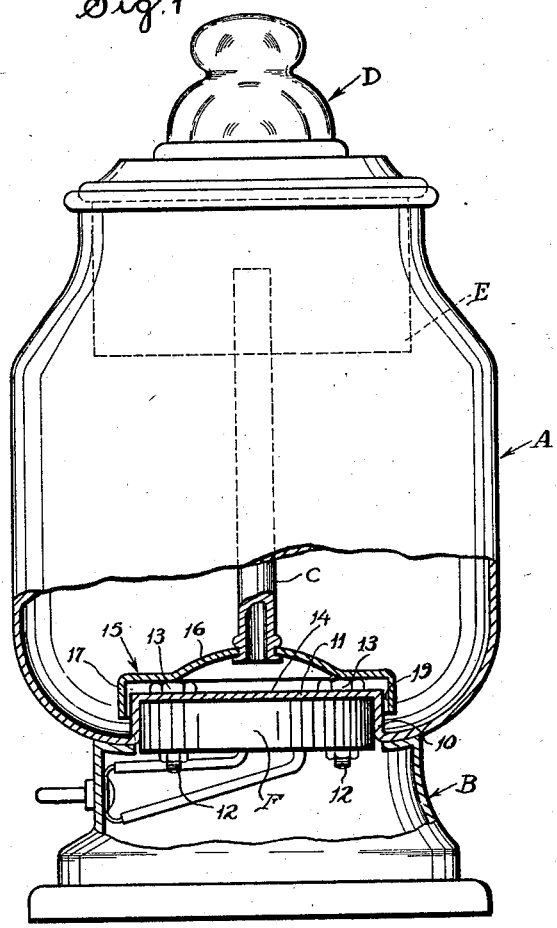
Figure 2:
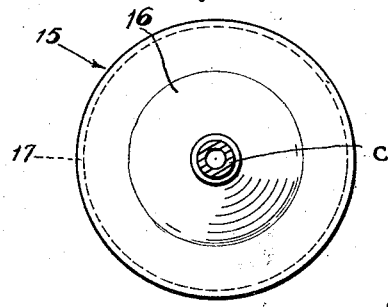

In the accompanying drawings, wherein I have shown, for illustrative purposes, one embodiment which the present invention may take:

Figure 1 is an elevational view, with parts in section, of a percolator in which my improvements are incorporated; and Fig. 2 is a top view of the member which forms the top of the heating chamber.

Referring to the drawings in detail, A designates a vessel or pot of any suitable shape or construction located on a base B. C designates a fountain tube which leads from the vaporizing chamber, hereinafter described more in detail, and discharges to the interior of a dome D. E is the usual perforated receptacle or tray located in the upper end of the pot and adapted to contain the material, such as coffee, onto which the liquid is sprayed and through which the liquid seeps back into the pot. The arrangement so far described is an old and well-known one and, therefore, these parts are shown more or less diagrammatically and for purposes of illustration only, as the particular construction thereof forms no part of the present invention.

The percolator may be heated in any suitable manner, but by way of illustration I have shown an electrical heating unit F for this purpose. The specific construction of this heating unit is not shown as, obviously, it may be varied as desired. For example, it may be of a construction similar to that shown in my Patent No. 1,060,264 granted April 29th, 1913. In the present illustrative disclosure, this heating unit is located in a recess provided in the bottom of the pot or bowl A by forming a raised central boss having a circumferential wall 10 and a top wall 11. By preference, the heating unit is in direct heat contacting relation to the walls 10 and 11. The top wall 11 forms the bottom of the vaporizing chamber. The heating unit may be secured in place in any suitable manner, as by means of bolts 12, the heads 13 of which serve to hold the upper member of the chamber in spaced relation to the lower member 11.

In accordance with the present invention, the upper wall of the heating chamber 14 is formed by a member 15 having a central opening in which the lower end of the fountain tube C is secured. This member 15 is in the form of a round base having a central dome-shaped portion 16 and a circumferential skirt 17 which surrounds the boss in which the heating unit is located. The internal diameter of the skirt 17 is slightly larger than the diameter of the wall 10 so as to leave an entrance passage 19 between these members. This entrance passage is generally of annular form and is substantially of uniform size or width throughout its height so that, irrespective of the position of the skirt with respect to the wall, the size of the entrance passage is always the same.

The operation of the device is briefly as follows: The pot having been filled with water to the desired level, and the coffee having been placed within the receptacle E, the current is turned on the heating unit F. The heat generated raises the temperature of the water within the heating chamber 14, causing the heated water to flow upwardly through the fountain tube C in a manner well understood. As the water is forced out of the chamber 14 through the tube C, water is drawn into the heating chamber through the passage 19 from the bottom of the pot. As this water flows through the passage 19, its temperature is raised and when it reaches the chamber 14, its temperature is further raised to a degree which will cause it to flow through the tube C. Although the pump may jump after the percolator has been in operation, the entrance passage 19 does not vary in size so that the flow of water through that passage is not affected by the jumping action, which means that a more uniform and positive operation is obtained. It will be observed that my improved arrangement is extremely simple; the use of gravity valves and the like being eliminated. There is nothing to get out of order. The bottom of the pot and all parts of the pump are readily accessible so that they can be kept in sanitary condition.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a percolator or the like, a pot having a fixed member in its bottom, means for heating said member, a movable member above said fixed member and forming therewith a vaporizing chamber, a fountain tube carried by said movable member and leading from said vaporizing chamber, and an entrance passage between said fixed member and movable member leading upwardly to said vaporizing chamber, said passage having an effective area which remains constant during movement of the movable member.

2. In a percolator or the like, a pot having a fixed vertical circumferential wall in its bottom and a wall adapted to form the bottom of a vaporizing chamber, a member spaced from said last mentioned wall and forming therewith a vaporizing chamber, and a fountain tube carried by said member and leading from said chamber, said member having a depending circumferential skirt encircling, spaced from and parallel to said circumferential wall so as to form therewith an entrance passage to said vaporizing chamber of uniform size, the receiving end of said passage being in unrestricted and uniform communication with the interior of said pot in all positions of said member.

3. In a percolator or the like, a pot having a raised boss in its bottom providing a vertical circumferential wall and a top wall, a heating element within said boss, a movable member over said top wall and forming therewith a vaporizing chamber, and a fountain tube leading from said chamber, said member having a vertical depending skirt surrounding said boss, said skirt and member defining a passage the effective area of which remains constant during movement of the said movable member, the lower end of said skirt being spaced from the bottom of said pot a distance at least as great as that between said skirt and said circumferential wall.

4. In a percolator or the like, a pot having a raised boss in its bottom forming a vertical circumferential wall and a top wall, a heating unit within said boss, bolts for securing said heating unit in place and having their heads extending above said upper wall, a dome-shaped member resting upon the heads of said bolts and forming with said upper wall a vaporizing chamber, and a fountain tube leading from said chamber, said member having a circumferential skirt parallel to, spaced from and surrounding said circumferential wall and forming therewith an entrance passage of uniform size throughout its height, the end of said skirt being spaced from the bottom of said pot a distance at least as great as that between said circumferential wall and skirt.

5. In a percolator or the like, a pot having a raised boss provided with a circumferential wall, a heating unit in said boss and in direct heat conductive relation to the circumferential wall and the top wall thereof, and a dome-shaped member over said boss and forming therewith a vaporizing chamber, said member having a depending skirt surrounding said circumferential wall to define a passage the effective area of which remains unchanged during movements of the dome-shaped member.

6. In a percolator or the like, a pot having a fixed surface portion adapted to be heated, and a movable member cooperatively disposed with respect to the fixed surface portion to provide a vaporizing chamber and an unvalved entrance passage leading from the pot into the vaporizing chamber, said surface portion and said movable member being so interfitted as to maintain said entrance passage of unvarying size in all positions of said movable member.

JOSEPH F. LAMB.